United States Patent
Yi et al.

(10) Patent No.: US 9,860,040 B2
(45) Date of Patent: Jan. 2, 2018

(54) METHOD AND APPARATUS FOR ALLOCATING RESOURCES FOR REFERENCE SIGNAL IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 14/760,965

(22) PCT Filed: Jan. 29, 2014

(86) PCT No.: PCT/KR2014/000831
§ 371 (c)(1),
(2) Date: Jul. 14, 2015

(87) PCT Pub. No.: WO2014/119919
PCT Pub. Date: Aug. 7, 2014

(65) Prior Publication Data
US 2016/0006546 A1    Jan. 7, 2016

Related U.S. Application Data

(60) Provisional application No. 61/760,031, filed on Feb. 1, 2013.

(51) Int. Cl.
*H04L 5/00* (2006.01)
*H04W 72/04* (2009.01)

(52) U.S. Cl.
CPC ............ *H04L 5/0048* (2013.01); *H04L 5/001* (2013.01); *H04L 5/0073* (2013.01);
(Continued)

(58) Field of Classification Search
CPC ...... H04L 5/001; H04L 5/0023; H04L 5/0048
See application file for complete search history.

(56) References Cited

U.S. PATENT DOCUMENTS

2012/0213261 A1* 8/2012 Sayana ................. H04L 5/0094
                                                  375/224
2013/0028180 A1  1/2013 Gao et al.
(Continued)

FOREIGN PATENT DOCUMENTS

KR   10-2012-0018040 A   2/2012
WO   WO 2012/109542 A1   8/2012

OTHER PUBLICATIONS

Research in Motion, UK Limited., "Resource Efficient Implicit PUCCH Resource Allocation for ePDCCH", 3GPP TSG RAN WG1 Meeting #71, R1-125227, New Orleans, USA, Nov. 12-16, 2012.
(Continued)

*Primary Examiner* — Edan Orgad
*Assistant Examiner* — Nourali Mansoury
(74) *Attorney, Agent, or Firm* — Birch, Stewart, Kolasch & Birch, LLP

(57) ABSTRACT

A method and apparatus for allocating resources for a reference signal in a wireless communication system are provided. A wireless device receives a configuration including the candidates resource element set (RES)s and indexes to be mapped to the candidates RESs for the reference signal; and receives an index indicating a RES selected according to a transmission point (TP) to perform a channel estimation by the reference signal received on the RES indicated by the index.

12 Claims, 10 Drawing Sheets

(52) U.S. Cl.
CPC ....... *H04L 5/0094* (2013.01); *H04W 72/0453* (2013.01); *H04L 5/0023* (2013.01)

(56) References Cited

U.S. PATENT DOCUMENTS

| | | | |
|---|---|---|---|
| 2013/0070634 A1* | 3/2013 | Gao ..................... | H04W 24/10 370/252 |
| 2013/0235839 A1* | 9/2013 | Kim ..................... | H04L 5/0092 370/329 |
| 2016/0029379 A1* | 1/2016 | Kuchibhotla ....... | H04W 76/023 370/329 |
| 2016/0100384 A1* | 4/2016 | Etemad ................ | H04W 24/04 370/329 |

OTHER PUBLICATIONS

Samsung., "LTE uplink ACK channel for downlink MCW MIMO support", 3GPP TSG RAN WG1 Meeting #48bis, R1-071565, Malta, Mar. 26-30, 2007.

* cited by examiner

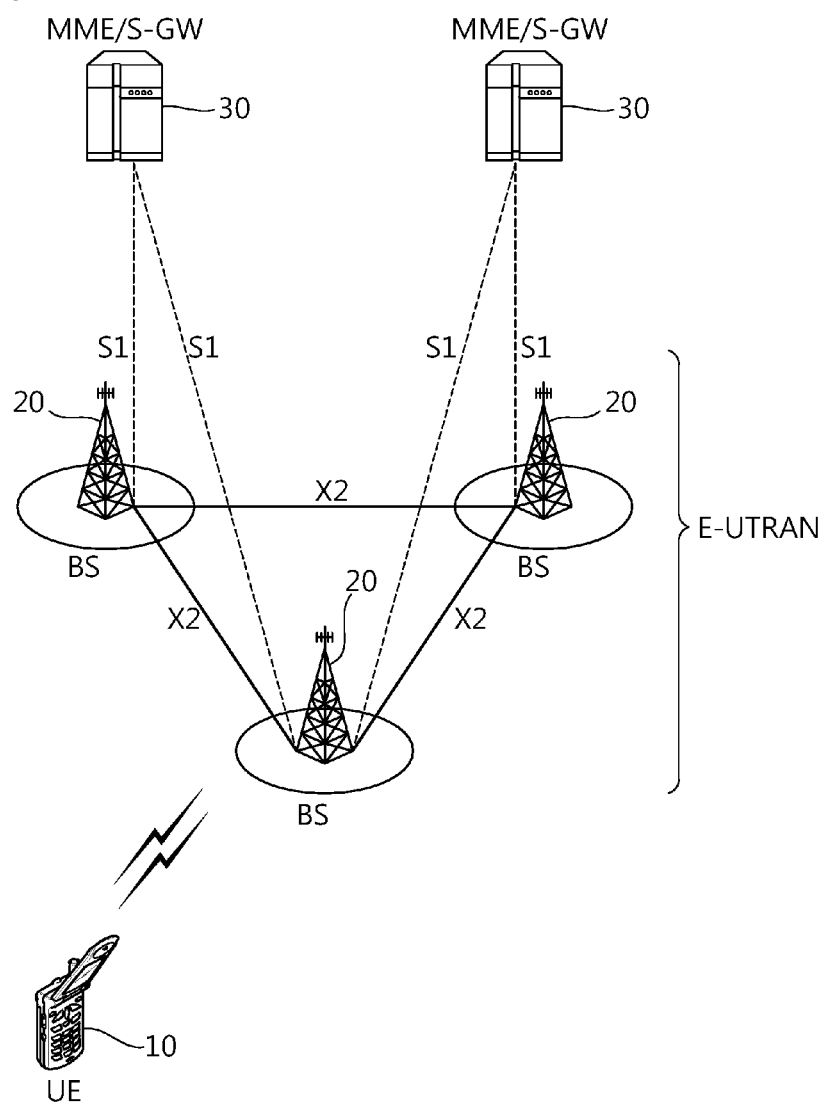
[Fig. 1]

[Fig. 2]
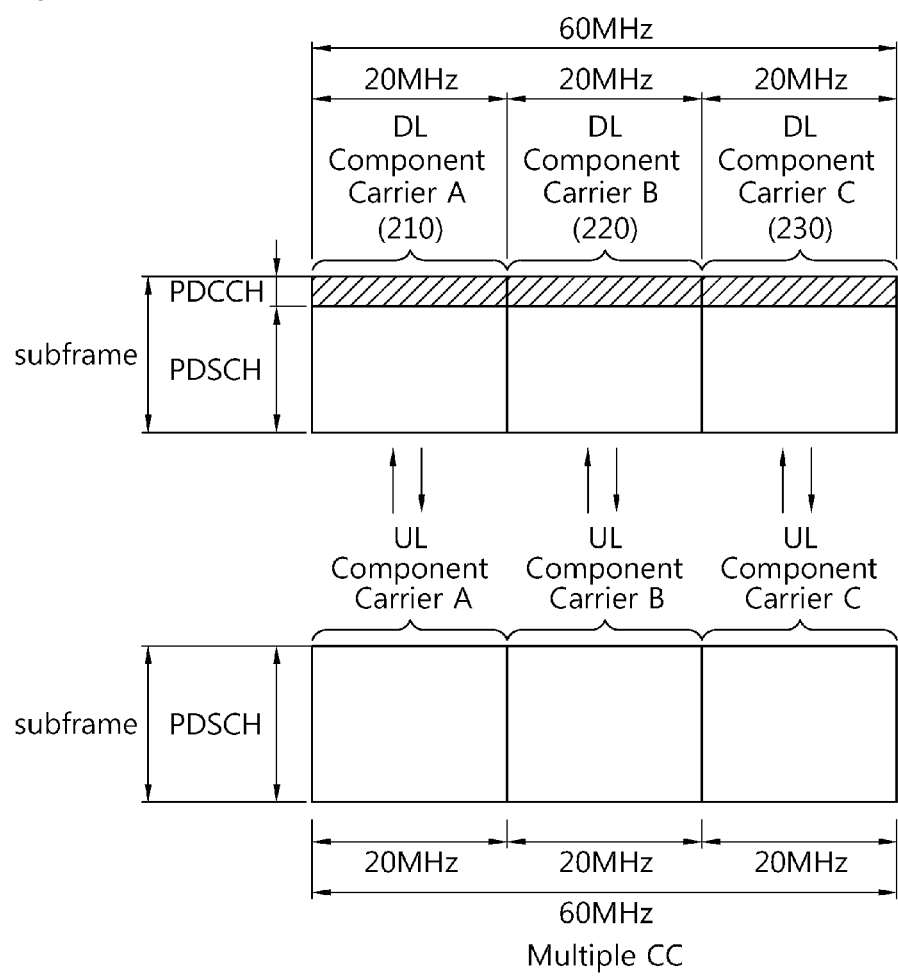

[Fig. 3]
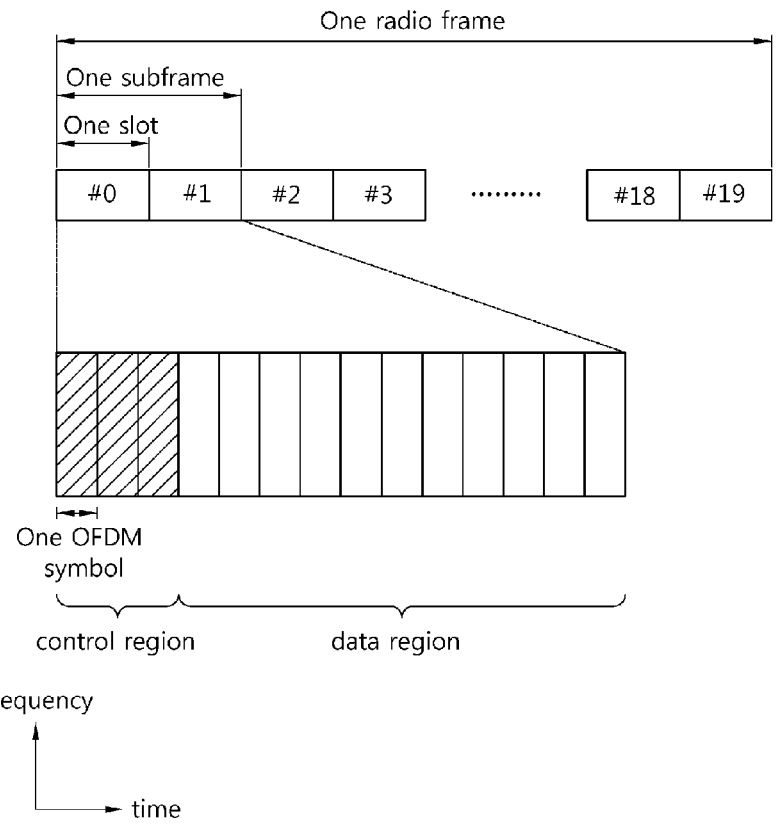
[Fig. 4]
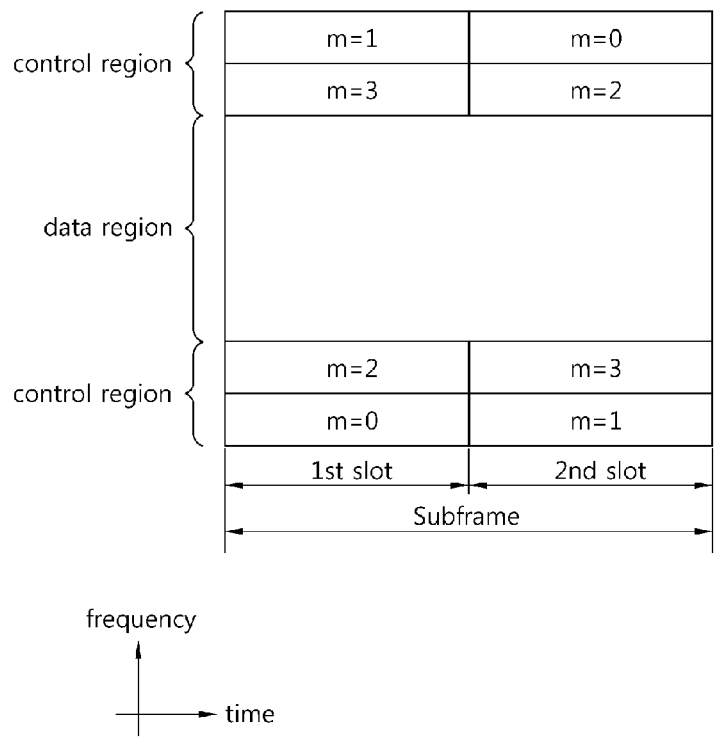

[Fig. 5]
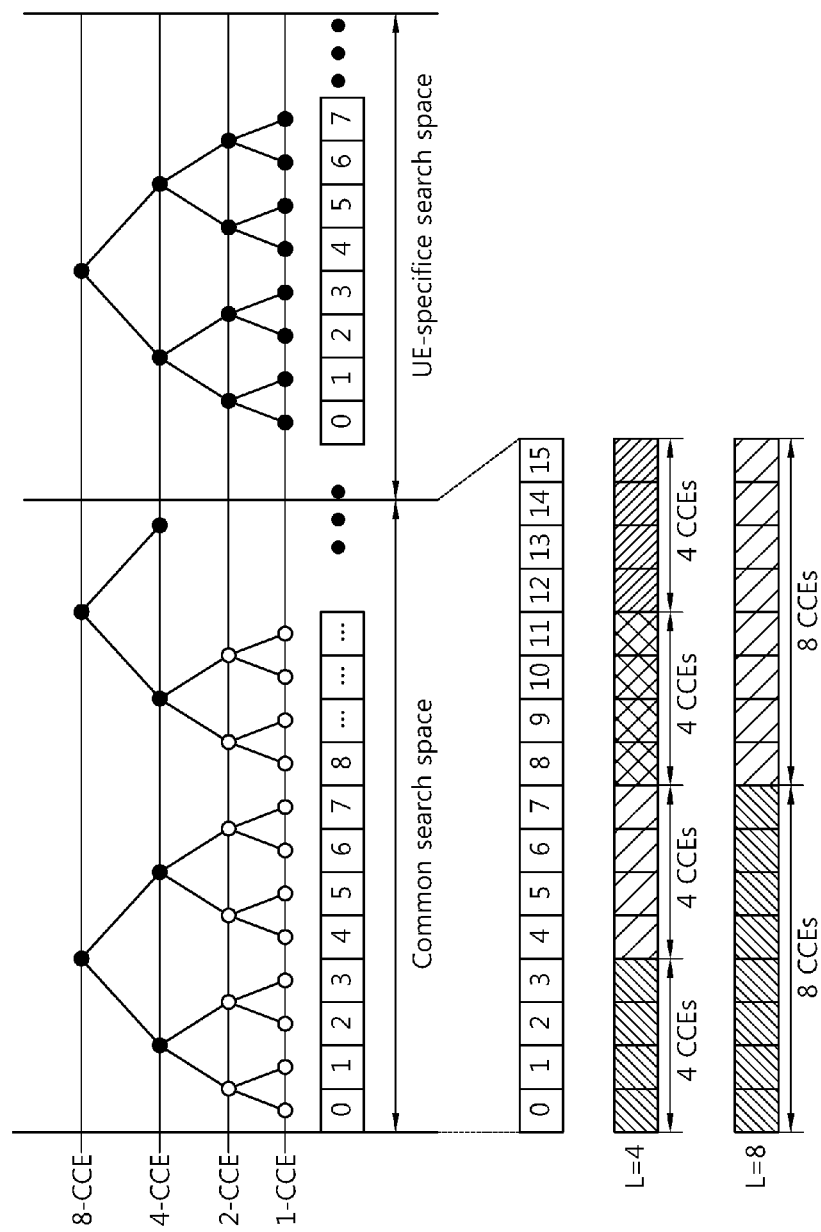

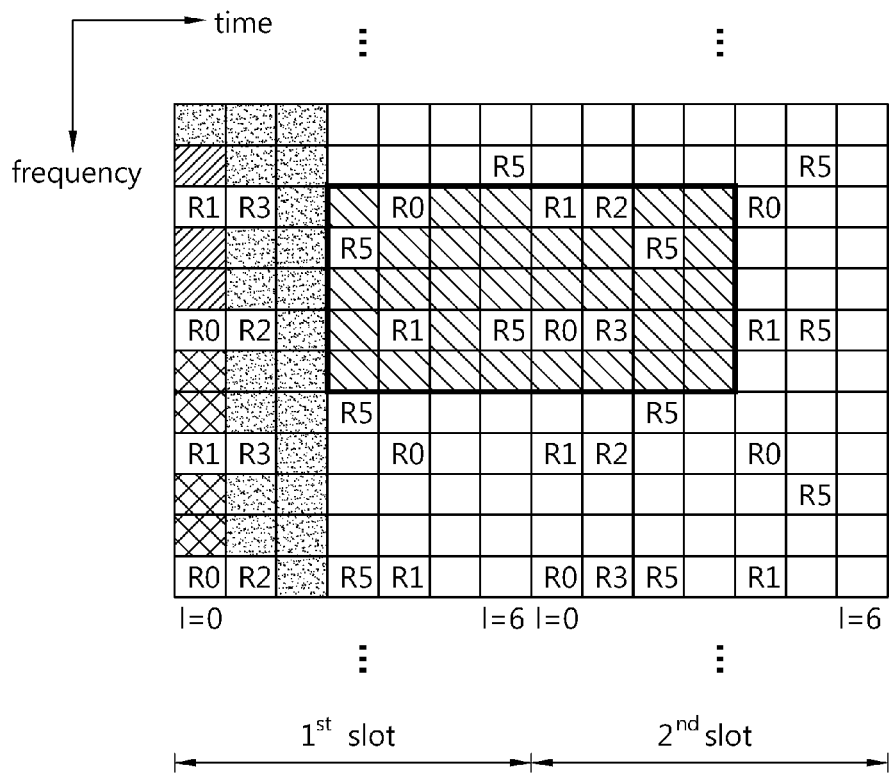
[Fig. 6]

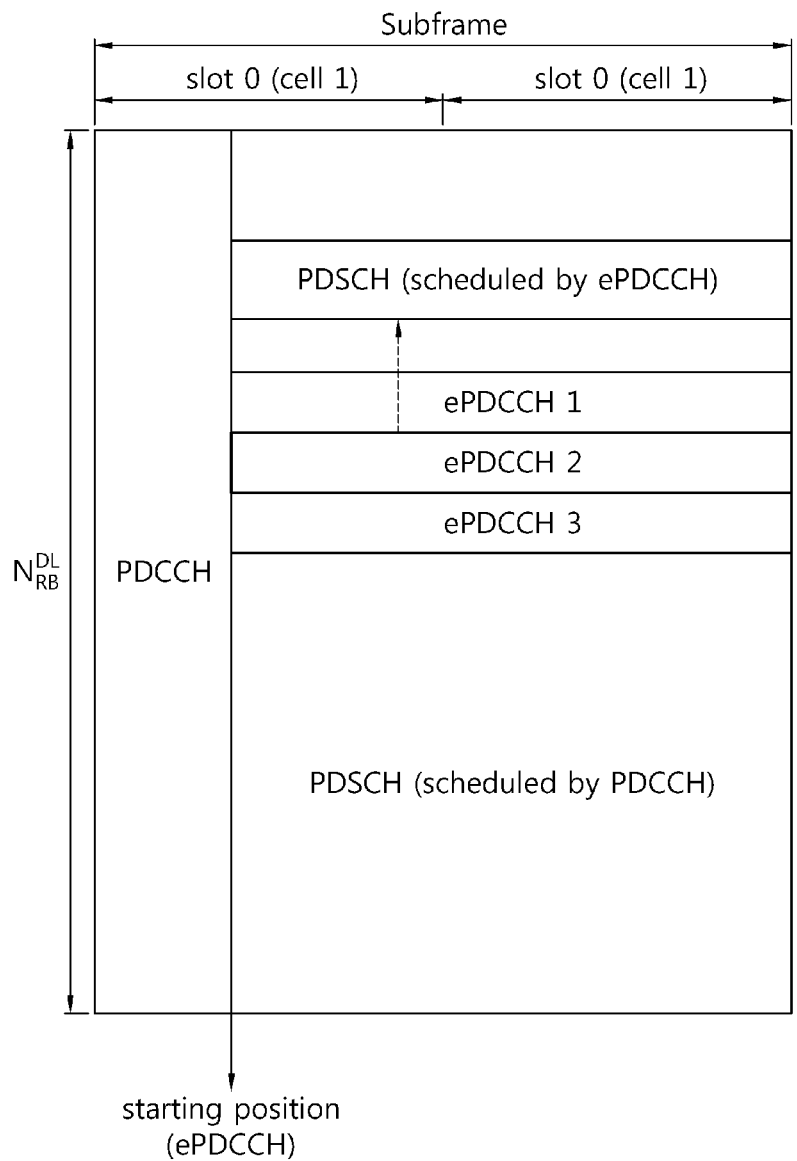

[Fig. 8]
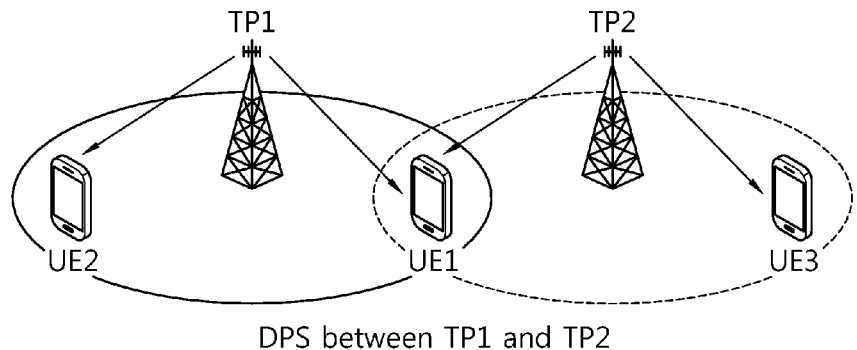
DPS between TP1 and TP2
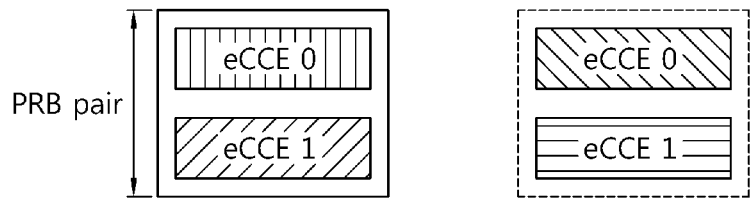
▯ : {Port 7, $(X_1, nSCID_1)$} for UE2
▬ : {Port 9, $(X_2, nSCID_1)$} for UE3
▰ : {Port 8, $(X_1, nSCID_1)$} for UE1 ⎱
▰ : {Port 8, $(X_2, nSCID_1)$} for UE1 ⎰ : DPS using configurable scrambling parameters

[Fig. 9]
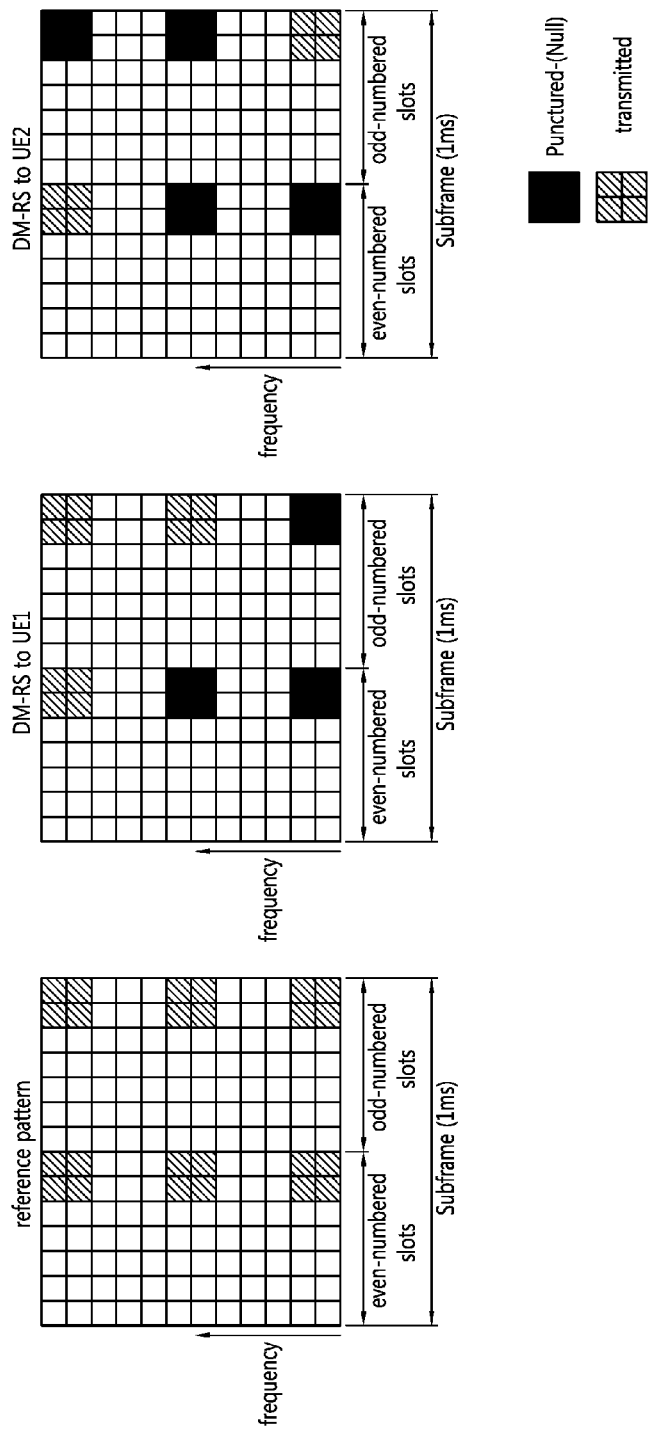

[Fig. 10]
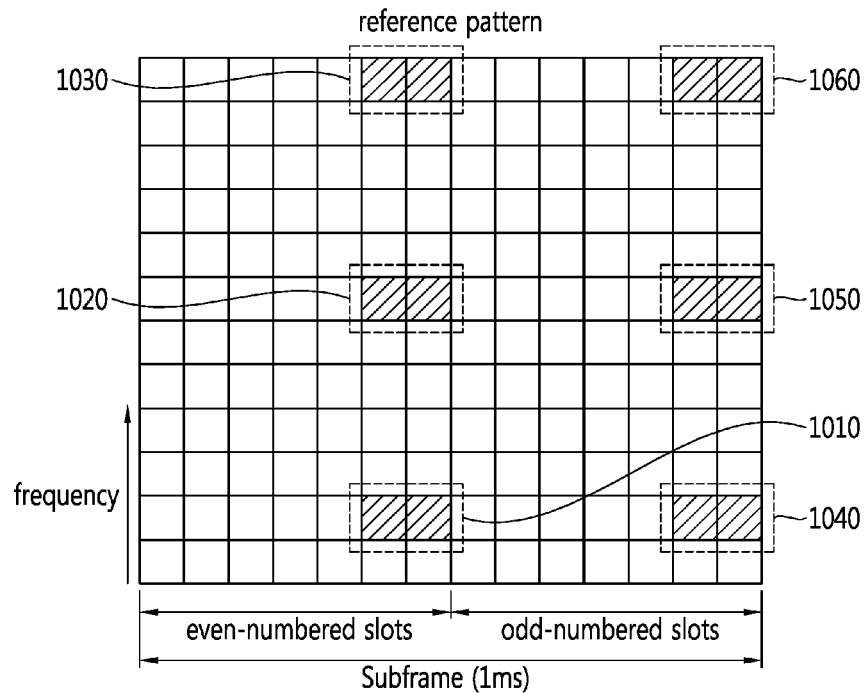
[Fig. 11]
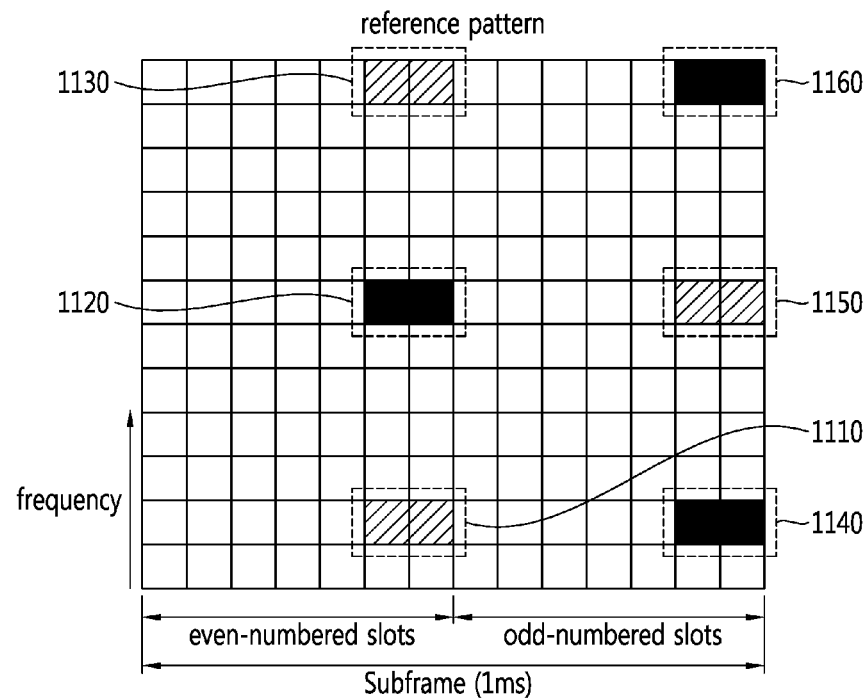

[Fig. 12]
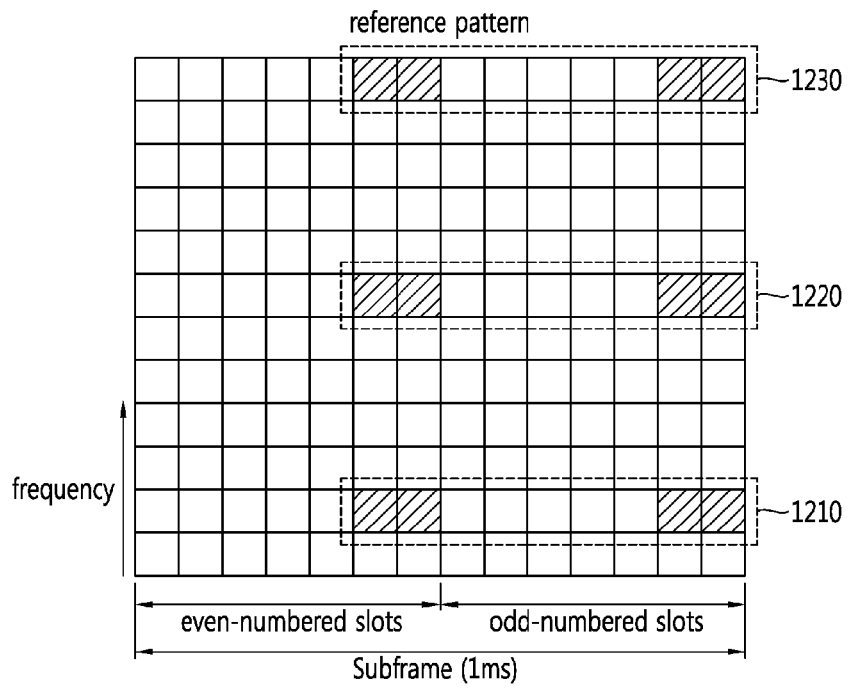
[Fig. 13]
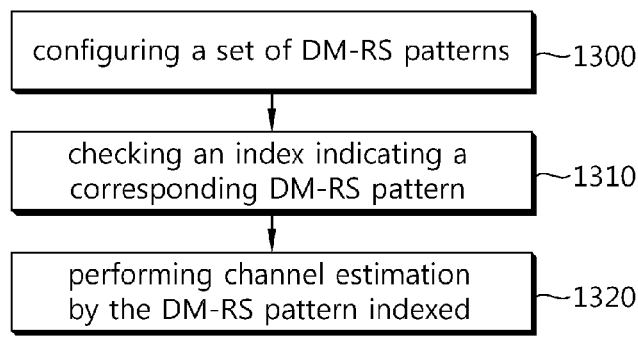
[Fig. 14]
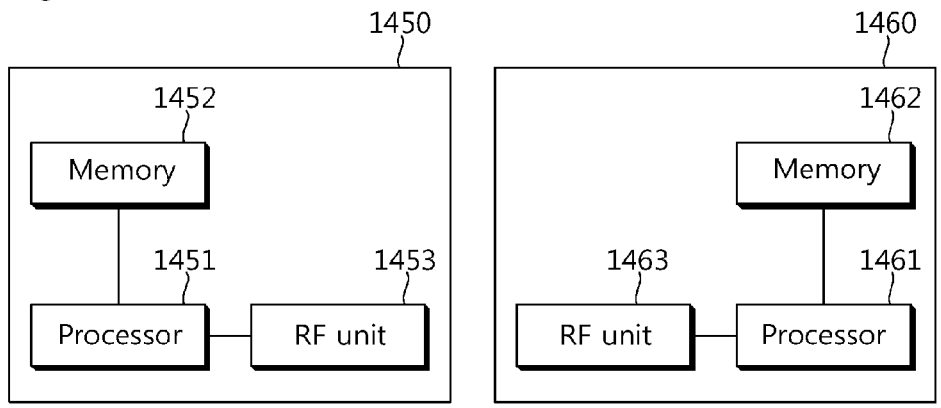

METHOD AND APPARATUS FOR ALLOCATING RESOURCES FOR REFERENCE SIGNAL IN WIRELESS COMMUNICATION SYSTEM

CROSS REFERENCE TO RELATED APPLICATIONS

This application is the National Phase of PCT International Application No. PCT/KR2014/000831, filed on Jan. 29, 2014, which claims priority under 35 U.S.C. 119(e) to U.S. Provisional Application No. 61/760,031, filed on Feb. 1, 2013, all of which are hereby expressly incorporated by reference into the present application.

TECHNICAL FIELD

The present invention relates to wireless communications, and more particularly, to a method and apparatus for allocating resources for a reference signal in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which may transmits restricted (or eliminated) controls and a small cell cluster environment where small cells within a cluster can collaborate to maximize the efficiency of operation can be considered. Furthermore, it is need to be defined to perform interference reduction of cells in a small cell cluster.

DISCLOSURE OF INVENTION

Technical Problem

The present invention provides a method and apparatus for allocating resources for a reference signal in a wireless communication system.

The present invention also provides a method and apparatus for performing channel estimation with a punctured resources pattern in a wireless communication system.

The present invention also provides a method and apparatus for performing data rate matching and decoding with a punctured resources pattern in a wireless communication system.

The present invention also provides a method and apparatus for checking an index indicating corresponding resources in a wireless communication system.

Solution to Problem

In an aspect, a method for allocating resources for a reference signal in a wireless communication system, performed by a wireless device is provided. The method may includes selecting a configuration including the candidates resource element set(RES)s and indexes mapped to the candidates RESs for the reference signal; checking an index indicating a RES selected according to a transmission point (TP); receiving the reference signal on a corresponding subcarrier and a corresponding OFDM symbol in the RES indicated by the index; and, performing a channel estimation by the reference signal.

The method may further include receiving bitmap information with length 6 to indicate 6 RESs, or with length 3 to indicate 3 pairs of the 6 RESs.

In another aspect, a wireless device for allocating resources for a reference signal in a wireless communication system is provided. The wireless device includes a radio frequency (RF) unit for transmitting and receiving a radio signal; and a processor operatively coupled to the RF unit, wherein the processor is configured for: selecting a configuration including the candidates resource element set (RES)s and indexes mapped to the candidates RESs for the reference signal; checking an index indicating a RES selected according to a transmission point (TP); receiving the reference signal on a corresponding subcarrier and a corresponding OFDM symbol in the RES indicated by the index; and, performing a channel estimation by the reference signal.

Advantageous Effects of Invention

The proposed embodiment supports that a wireless device can detect a resource (or resources) allocated for a new reference signal to support more efficient measurement for data transmission.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a downlink radio frame to which the present invention is applied.

FIG. 4 shows a structure of an uplink subframe to which the present invention is applied.

FIG. 5 shows an example of monitoring a physical downlink control channel (PDCCH).

FIG. 6 shows an example of displaying a reference signal and a control channel in a downlink subframe.

FIG. 7 shows an example of a subframe having an extended PDCCH.

FIG. 8 shows a wireless communication system supporting small cells as exemplary embodiment of the present invention.

FIG. 9 shows an example for resource allocation of a reference signal which the present invention is applied.

FIG. 10 to FIG. 12 shows examples for indexing resource allocation which the present invention is applied.

FIG. 13 shows an example of flow chart for determining resource allocation which the present invention is applied.

FIG. 14 shows a block diagram of a wireless communication system according to an embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated in this example, 3 carriers existed is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or de-activated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS. A UE can be configured with multiple carrier groups where each group may have one PCell which is activated all the time and PUCCH can be transmitted to. For a convenience, those cells can be called as PCell. For example, if two carrier groups are exist, there could be PCell for the first group and S-PCell which is the PCell for the second group.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a 7th bit from the left, which are the remaining indices other than 0, i.e., the index of the Pcell. Herein, the index of the serving cell may be a logical index determined relatively for each UE, or may be a physical index for indicating a cell of a specific frequency band. The CA system supports a non-cross carrier scheduling (self-carrier scheduling), or cross carrier scheduling.

FIG. 3 shows a structure of a downlink (DL) radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply withe changeable manners to a corresponding system.

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one RBG.

A subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A physical broadcast channel (PBCH) is transmitted in first four OFDM symbols in a second slot of a first subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH (or ePDCCH) is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to a Downlink Control Information (DCI) to be transmitted to the UE, attaches a CRC to the DCI, and masks a unique identifier (referred to as a radio network temporary identifier (RNTI)) to the CRC according to an owner or usage of the PDCCH.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level. The BS determines the number of CCEs used in transmission of the PDCCH according to a channel state.

For example, a UE having a good downlink channel state can use one CCE in PDCCH transmission. A UE having a poor downlink channel state can use 8 CCEs in PDCCH transmission. A control channel consisting of one or more CCEs performs interleaving in an REG unit, and is mapped to a physical resource after performing cyclic shift based on a cell identifier (ID).

FIG. 4 shows a structure of an uplink subframe in 3GPP LTE-A.

Referring to FIG. 4, an UL subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary. RBs belonging to the RB pair occupy different subcarriers in each of a 1st slot and a 2nd slot. And m is a location index indicating a logical frequency-domain location of the RB pair allocated to the PUCCH in the subframe. It shows that RBs having the same value m occupy different subcarriers in the two slots.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

FIG. 5 shows an example of monitoring a PDCCH. As described, the 3GPP LTE system uses blind decoding to detect the PDCCH. The blind decoding is a scheme in which a specific identifier is de-masked from a CRC of received PDCCH (referred to as candidate PDCCH) data and thereafter whether the PDCCH is its own control channel is determined by performing CRC error checking. The UE cannot know about a specific position in a control region in which its PDCCH data is transmitted and about a specific CCE aggregation level or DCI format used in transmission.

A plurality of PDCCHs may be transmitted in one subframe. The UE monitors the plurality of PDCCHs in every subframe. Herein, monitoring is an operation in which the UE attempts to perform blind decoding on the PDCCH.

The 3GPP LTE uses a search space to reduce an overload caused by the blind decoding. The search space may also be called a monitoring set of a CCE for the PDCCH. The UE monitors the PDCCH within a corresponding search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information may also be transmitted in the common search space. The UE-specific search space supports a PDCCH having a CCE aggregation level of {1, 2, 4, 8}. Table 1 shows the number of PDCCH candidates monitored by the UE.

TABLE 1

| Search Space Type | Aggregation level L | Size [in CCEs] | Number of PDCCH candidates | DCI formats |
| --- | --- | --- | --- | --- |
| UE-specific | 1 | 6 | 6 | 0, 1, |
|  | 2 | 12 | 6 | 1A, 1B, 1D, 2, |
|  | 4 | 8 | 2 | 2A |
|  | 8 | 16 | 2 |  |
| Common | 4 | 16 | 4 | 0, 1A, 1C, |
|  | 8 | 16 | 2 | 3/3A |

A size of search space is determined by Table 1 above, and a starting position of the search space is defined differently in the common search space and the UE-specific search space. Although a starting position of the common search space is fixed irrespective of a subframe, a starting position of the UE-specific search space may vary in every subframe according to a UE identifier (e.g., C-RNTI), a CCE aggregation level, and/or a slot number in a radio frame. If the starting position of the UE-specific search space exists in the common search space, the UE-specific search space and the common search space may overlap.

In an aggregation level L∈{1,2,3,4}, a search space $S^{(L)}_k$ is defined as the set of PDCCH candidates. In the search space $S^{(L)}_k$, a CCE corresponding to a PDCCH candidate m is given by Equation 1 below.

$$L \cdot \{(Y_k + m') \bmod \lfloor N_{CCE,k}/L \rfloor\} + i \quad \text{[Equation 1]}$$

Herein, i=0, 1, . . . , L−1, m=0, . . . , $M^{(L)}$−1. $N_{CCE,k}$ denotes the total number of CCEs that can be used in transmission of a PDCCH in a control region of a subframe k. The control region includes a set of CCEs numbered from 0 to $N_{CCE,k}$−1. $M^{(L)}$ is the number of PDCCH candidates in a CCE aggregation level L of a given search space. If a carrier indicator field (CIF) is set to the UE, m'=m+M$^{(L)}$n$_{cif}$. Herein, n$_{cif}$ is a value of the CIF. If the CIF is not set to the UE, m'=m.

In a common search space, Y$_k$ is set to 0 with respect to two aggregation levels L=4 and L=8. In a UE-specific search space of the aggregation level L, a variable Y$_k$ is defined by Equation 2 below.

$$Y_k = (A \cdot Y_{k-1}) \bmod D \quad \text{[Equation 2]}$$

Herein, Y$_{-1}$=n$_{RNTI}$≠0, A=39827, D=65537, k=floor(n$_s$/2). n$_s$ denotes a slot number in a radio frame.

In 3GPP LTE/LTE-A, transmission of a DL transport block is performed in a pair of the PDCCH and the PDSCH. Transmission of a UL transport block is performed in a pair of the PDCCH and the PUSCH. For example, the UE receives the DL transport block on a PDSCH indicated by the PDCCH. The UE receives a DL resource assignment on the PDCCH by monitoring the PDCCH in a DL subframe. The UE receives the DL transport block on a PDSCH indicated by the DL resource assignment.

FIG. 6 shows an example of displaying a reference signal and a control channel in a DL subframe.

A control region includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region in which the UE monitors the PDCCH.

Various reference signals are transmitted in the subframe.

A cell-specific reference signal (CRS) may be received by all UEs in a cell, and is transmitted across a full downlink frequency band. In FIG. 6, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence r$_{l,ns}$(m) for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, . . . , 2N$_{maxRB}$−1. N$_{maxRB}$ is the maximum number of RBs. n$_s$ is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, Nc=1600, and a first m-sequence is initialized as x1(0)=1, x1(n)=0, m=1, 2, . . . , 30. A second m-sequence is initialized as c$_{init}$=2$^{10}$(7(ns+1)+l+1)(2N$^{cell}_{ID}$+1)+2N$^{cell}_{ID}$+N$_{CP}$ at a start of each OFDM symbol. N$^{cell}_{ID}$ is a physical cell identifier (PCI). N$_{CP}$=1 in a normal CP case, and N$_{CP}$=0 in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 6, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 6 in addition to a region in which the PDSCH is transmitted, this is for indicating a location of an RE to which the URS is mapped.

The URS is used only by a UE which receives a corresponding PDSCH. A reference signal (RS) sequence r$_{ns}$(m) for the URS is equivalent to Equation 3. In this case, m=0, 1, . . . , 12N$_{PDSCH,RB}$−1, and N$_{PDSCH,RB}$ is the number of RBs used for transmission of a corresponding PDSCH. A pseudo-random sequence generator is initialized as c$_{init}$=(floor(ns/2)+1)(2N$^{cell}_{ID}$+1)2$^{16}$+n$_{RNTI}$ at a start of each subframe. n$_{RNTI}$ is a UE identifier.

The aforementioned initialization method is for a case where the URS is transmitted through the single antenna, and when the URS is transmitted through multiple antennas, the pseudo-random sequence generator is initialized as c$_{init}$=(floor(ns/2)+1)(2N$^{cell}_{ID}$+1)2$_{16}$+n$_{SCID}$ at a start of each subframe. n$_{SCID}$ is a parameter acquired from a DL grant (e.g., a DCI format 2B or 2C) related to PDSCH transmission.

Meanwhile, the ePDCCH can be one of solutions of limitation for a PDCCH transmission or new control information transmission of near future commination system including a new type of carrier as shown in FIG. 7. The ePDCCH which can be multiplexed with the PDSCH can support multiple Scells of the CA.

Referring to FIG. 7, the ePDCCH can be placed in data region which conveys control information. So, the UE can monitor a plurality of PDCCH/ePDCCHs within the control region and/or data region. The ePDCCH regions may be monitored by one UE, a UE group, or UEs in a cell. If a specific UE monitors the ePDCCH, n$_{RNTI}$ or n$_{SCID}$ which is used to initialize a pseudo-random sequence generator of the URS may be obtained on the basis of an identifier of the specific UE. If a UE group monitors the ePDCCH regions, n$_{RNTI}$ or n$_{SCID}$ which is used to initialize a pseudo-random sequence generator of the URS may be obtained on the basis of an identifier of the UE group. When the ePDCCH regions are transmitted through multiple antennas, the same precoding as that of the URS may be applied to the ePDCCH regions.

As the PDCCH is transmitted on CCE, ePDCCH can be transmitted on eCCE (enhanced CCE) as an aggregation of some contiguous CCEs, the eCCE corresponds to a plurality of REGs. An aggregation level is a resource unit for monitoring an ePDCCH. For example, when one CCE is a minimum resource for the ePDCCH, the aggregation level may be defined as a multiple of 2 (e.g., 1, 2, 4, 8, . . . ) of a CCE, and a search space may be defined according to each aggregation level. The search space includes at least any one of a common search space and a UE-specific search space.

If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification may not be sufficient to perform those functions as there are a large number of neighbor small cells which like to use orthogonal resources.

More details, this invention considers cases where cell-specific RS used for tracking and the RRM measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This invention which supports a dense small cell environment with non-ideal backhaul among small cells provides interference coordination. Specially, semi-statically operating interference coordination scheme may need other operation scheme due to dynamics of traffic and also dynamics of small cell on/off as well as UE on/off. Herein, the cell on/off includes that a cell is in a discontinuous transmission (DTX) state for transmitting a measurement signal or a synchronization signal if the cell off is. If else the cell on is, a cell is in a continuous transmission (TX) state for transmitting a measurement signal or a synchronization signal. It can be a de-activated cell when a cell operates into an off state, and an activated cell when a cell operates into an on state.

To minimize the impact on legacy UEs, the proposed embodiment provides optimizations to improve interference situation in small cells which are dependent on DM-RS based transmission rather than CRs-based transmission such as transmission mode 9 or transmission mode 10.

FIG. 8 shows a wireless communication system within small cells as exemplary embodiment of the present invention.

Referring to FIG. 8, when a small coverage of a small cell e.g., 50 m-100 m is considered, it is highly likely that small cells may not discover each other directly and thus may not identify interfering neighbor cells directly. Moreover, small cells each would be not controlled by the network, and thus UE involvement in terms of interference handling and synchronization handling would be necessary.

Especially, a UE with low mobility such as a user inside the building moving within a same floor is considered, it is likely that few small cells formed a cluster which may cover the UE. For example, the UE1, UE2, UE3 locates within Cell 1 and Cell 2 as shown in FIG. 8, the proposed embodiment particularly focuses on CoMP technique where each TP (transmission point) is differentiated based on new DM-RS patterns. The CoMP has assumptions including cells within a small cell cluster would turn on or off its power, or transmission to save energy and mitigate inter-cell interference.

UE 2 in a cell under a TP1 monitors the ePDCCH transmitted on eCCE 0 which is used to initialize a pseudo-random sequence with $n_{SCID1}$ for Port 7. $n_{SCID}$ 1 is a parameter acquired from a DL grant related to PDSCH transmission and the aggregation level of eCCE 0 is a resource unit for monitoring an ePDCCH of UE 2. To reduce interference within small cells, UE 3 in a cell under a TP 2 monitors the ePDCCH transmitted on eCCE 1 which is used to initialize a pseudo-random sequence with $n_{SCID1}$ for Port 9. The aggregation level of eCCE 1 is a resource unit for monitoring an ePDCCH of UE 3 and distinguished from the eCCE 0 clearly since the eCCE1 and eCCE 0 are orthogonal.

Meanwhile, UE 1 in a cell overlapped between the TP1 and TP 2 monitors the ePDCCH transmitted on eCCE 1 which is used to initialize a pseudo-random sequence with $n_{SCID1}$ for Port 8 from the TP1 and the ePDCCH transmitted on eCCE 0 which is used to initialize a pseudo-random sequence with $n_{SCID1}$ for Port 8 from the TP2. The aggregation level of eCCE 1 from the TP1 is distinguished from the eCCE 0 from the TP2 clearly since the eCCE1 and eCCE 0 in a same TP are orthogonal in each TP.

As described, it is assumed that an example of a new reference signal for measurement and synchronization on a new carrier is transmitted with longer period, e.g., T=200, or more than 200 and for a UE with low mobility. So the proposed embodiment supports that a few DM-RS REs per PRB would satisfy the channel estimation performance even with usage of the limited resources. This invention discusses to utilize the remaining REs which may be used for such as DM-RS for a high speed UE to satisfy the performance requirement. Examples of different DM-RS pattern for UE1 and UE2 are shown in the FIG. 9.

First of all, a configuration of a reduced DM-RS Pattern is feasible as followings. A higher layer signaling to reconfigure a DM-RS Pattern can be used, some RRC reconfiguration consideration are needed. Or, an Indication via DCI can be used, it may not be used for ePDCCH PRBs, the Indication indicates a corresponding DM-RS Pattern. For this, the DM-RS Patterns each could be indexed with predetermined bits. Implicit selection of a pattern can be based on UE ID such as C-RNTI, virtual RNTI, etc. Or a subframe index or SFN, PRB index, cell ID such as virtual cell ID, cell ID, TP ID, and a mixed of two or more combinations of these mentioned can be used for the selection of the DM-RS patterns. To randomize the interference, it is desirable to use different pattern per subframe and/or per PRB. Thus, if implicit selection of pattern is used, some randomization function over frequency and time are considered.

This embodiment focuses on the implicit selection approach and discusses the mechanisms of mapping for the DM-RS patterns. For the convenience, a DM-RS pattern is defined as a set of REs per PRB where DM-RS are transmitted. A relationship between DM-RS patterns for example are (1) $A \subset B$ where DM-RS REs of pattern A is a subset of DM-RS REs of pattern B (2) $RE_{DM\_RS}$ (A∩B) are the DM-RS REs used for both pattern A and pattern B, $RE_{MRS,A}$ are the REs are used for muting for pattern A.

First, a UE can be preconfigured or be prefixed with a set of DM-RS patterns. These patterns can be also higher layer configured. For example, a few DM-RS patterns are selected based on performance requirement and evaluation results among possible DM-RS patterns. For example, DM-RS pattern with two small number of REs per PRB may be excluded due to potentially poor performance in channel estimation. A pattern can be defined as a number of randomly selected REs per usable DM-RS REs where the number of those selected REs may be variable or fixed. The number of candidate DM-RS REs is set with a fixed number per bundled PRB, PRB, and PRB pair, in a subframe, UE where the number may be same or different. For example, DM-RS pattern specified in LTE specification for downlink UE-specific RS can be used as a baseline to generate variations of DM-RS patterns. Or a fixed number per OFDM symbol is determined for the number of DM-RS REs. Variation with the fixed number related to the PRB or the fixed number related to the OFDM symbol with a range of values [min, max] where the number is selected within the range. Or variation with the fixed number related to the PRB or the fixed number related to the OFDM symbol with association with antenna port where the number could be determined with consideration of number of antenna port or antenna ports used for transmitting ePDCCH or PDSCH in PRBs where DM-RS are transmitted.

In terms of selecting a DM-RS pattern, two overall approaches can be considered. One is to select a DM-RS pattern per PRB pair and thus, different PRB pairs can have different DM-RS patterns where PRB bundling with same precoding can be preserved. Another approach is to use the same DM-RS pattern per subframe regardless of PRB bundling unit. The choice between two approaches would be related to the complexity of DM-RS pattern selection function. If the function takes frequency and time as input parameters, different patterns can be selected. Otherwise, the same pattern may be used for PRBs in a same TTI.

A fixed number or pattern per UE mobility pattern such as 6 with antenna port 7 for low speed UE, 8 with antenna port 8 for medium speed UE, with antenna port 12 for high speed UE can be set. A higher layer configured a set of DM-RS patterns is signaled to UE.

Based on above mechanisms, a UE can select a DM-RS pattern A where A ⊂ B (B is a reference DM-RS pattern used for a set of TPs (e.g., within a small cell cluster) or for a cell or for a UE). For example, a reference DM-RS pattern is a Rel-11 DM-RS pattern in normal CP in normal subframe. The reference pattern may be predetermined, or transmitted via system information or higher layer configured. If any reference pattern is not configured, UE may assume that a Rel-11 legacy pattern is the reference pattern.

Once it selects a DM-RS pattern, a UE may assume that other REs not used for the selected pattern compared to the reference configuration will not be used for any transmission (i.e., punctured). The data will be rate-matched around those REs. In this case, a UE may be configured with additional higher signaling in terms of rate matching whether those unused REs compared to a reference pattern or legacy pattern will be used for PDSCH or ePDCCH transmission or punctured.

When a number of REs are selected, a few constraints can be considered. First, an adjacent two DM-RS REs in a reference pattern shall be selected or not together. This is to allow CDM between DM-RS REs. Secondly, RE selection may occur per antenna port. However, between antenna ports which use CDM to differentiate may select the same pattern for the best performance of CDM. For example, the same DM-RS pattern for antenna port 7/9 may be selected so that CDM can be applied. Given this condition, selection algorithms of DM-RS REs given a reference configuration and a number of DM-RS REs are follows. For example, 12 DM-RS REs are used for a reference pattern (e.g., a legacy pattern), the index of a DM-RS RE pair (two DM-RS REs) can be given per PRB or per bundled PRB in order using 1) first frequency and then OFDM symbol, 2) first OFDM symbol and then frequency, 3) an Index given by a higher layer signal, 4) an Index with a randomized pattern calculated.

As described, when the reference signal patterns are provided, the DM-RSs to UE 1 of a A regions are punctured for reducing interference between other UEs such as UE2, and the DM-RSs to UE 2 of a B regions are punctured for reducing interference between other UEs such as UE1. That is eNB can check candidates for DM-RS REs of UE 1 and UE 2, and allocate specific REs for the UE 1 distinguishing between specific REs for the UE 2 not to be overlapped at least 2 groups of REs among the predetermined REs in reference patterns. Herein the number of REs or a number of REGs for the DM-RSs can be changed with consideration for UE's mobility or distance between and a UE and TP. In FIG. 9, the DM-RS to UE2 are allocated in specific REs among the candidates except the DM-RS REs allocated to UE 1.

Furthermore, a DM-RS index for the proposed embodiment are shown as below in FIG. 10. The FIG. 10 to FIG. 12 shows examples for indexing resource allocation which the present invention is applied.

There are candidates of DM-RS REs, a Resource Element Set (RES) is a set of 2 consecutive resource elements for the DM-RS in small cell. Each REG may be designated for assignment with an index; here the RESs are indexed in frequency and then OFDM symbol order as example. For this, a UE may configure by receiving an additional higher signaling to match REs. The UE may check an index indicating whether those REs of DM-RS pattern used for a set of a corresponding TP is or not by comparing to a reference patterns. For the candidates of DM-RS REs, an index is mapped to a corresponding DM-RS pattern of a set of a corresponding TP. Here, the Resource Element Set (RES) can be called as special Resource Element Group (S_REG) or sub of REG, but the term of the RES is not limited for only the term, it can be extended or changed with modification as necessary.

For example with FIG. 11, if a cell ID is used for a selection, a randomization function is used with cell ID and subframe, the index generates [1 0 1 0 1 0]. So the UE can determine and configure that 3 RE sets (or pairs) having the indexes 1, 3, and 5 are selected when the number of DM-RS REs is 6. And then the UE can measure and synchronize RS transmitted using 3 RE groups (or pairs) having the indexes 1, 3, and 5 among the DM-RS patterns shown. The 3 RE sets (or pairs) having the indexes 2, 4, and 6 can be used for other TP of DM-RS.

A randomized function may be designed such that the number of selected DM-RS REs per OFDM symbol should not less than number of DM-RS REs divided by 4 (e.g., 1 in the example). If bundled PRB is used to select DM-RS REs, there could be a minimum number can be determined per PRB.

When multiple layers are used, OCC should not be impacted by the reduced pattern. More specifically, with layer >4, the DM-RS pairs in the same sub-carrier would be the selection criteria as seeing the below FIG. 12. In other words, all REs in the same subcarrier are selected or not in a bundled fashion. So the UE can determine and configure that 3 REs pairs in the same subcarrier having the indexes 1, 2, and 3 are selected in FIG. 12.

FIG. 13 shows an example of flow chart for indexing resource allocation which the present invention is applied.

Referring to FIG. 13, a UE can configure a set of DM-RS patterns via a predetermined, transmitted on system information, or a higher layer signal (1300). Herein the set of DM-RS patterns is allocated on 12 DM-RS REs, the DM-RS RE pair of two DM-RS REs is indexed each. The index is assigned by using frequency and OFDM symbol order as example.

And then, the UE can check an index indicating that it is assigned to a corresponding DM-RS REs among a set of DM-RS patterns (1310). For example, the UE check two REs located in second frequency and 6, 7 OFDM symbols in first slot when the index is set to 1. The index field of new RS of TP is set by using a Cyclic shift and OCC index for RS in DCI formats 2, 2A, 2B and 2C, the new index field refers to the one for the candidates DM-RS REs. Table 2 shows that the index field for Scheduling of new-RS REs. The index of values indicates a corresponding REG including a frequency and symbol according to a TP (cell ID).

TABLE 2

|  | DCI format 0 | DCI format 1/1A | DCI format 2/2A/2B/2C |
|---|---|---|---|
| Index of new RS | set to '000' | set to '000' | set to '000' |

As described, validation for Scheduling of new-RS REs is achieved if the respective field used DCI format is set according to Table 2.

The UE can perform channel estimation by checking the RS REs indicated by the index (1320). Herein the 12 REs selected from a demodulation reference signal (DM-RS) REs are used for the discovery signal of TP.

FIG. 14 is a block diagram showing a wireless communication system according to an embodiment of the present invention.

A BS 1450 includes a processor 1451, a memory 1452, and a radio frequency (RF) unit 1453. The memory 1452 is coupled to the processor 1451, and stores a variety of information for driving the processor 1451. The RF unit 1453 is coupled to the processor 1451, and transmits and/or receives a radio signal. The processor 1451 implements the proposed functions, procedures, and/or methods. In the embodiments of FIG. 2 to FIG. 13, the operation of the BS can be implemented by the processor 1451.

Especially, the processor 1451 may configure one or more cells with different frequencies, for this invention the processor 1451 configures the cells to support Semi-Persistent Scheduling, TTI-bundling, HARQ-ACK procedures. The processor 1451 may configure a configuration for resource mapping of DM-RS or new RS REs in small cells. Here, the configuration includes a first RS configuration for a macro cell, the first RS configuration includes at least one of configuration for a primary synchronization signal (PSS) and a secondary synchronization signal (SSS), a cell-common reference signal (CRS), or channel information reference signal (CSI-RS) to be transmitted on the macro cell. Furthermore, the configuration includes a second RS configuration for a small cell, and the second RS configuration includes a configuration for discovery signals to be transmitted on the small cell, the REs of a set of DM-RS patterns used for a corresponding TP among TPs in the small cell are included.

The processor 1451 may set and provide index of the REs of a set of DM-RS patterns and co-location information for the time tracking and frequency tracking between the macro and the small cell. Also the processor 1451 may set an index of {<frequency, OFDM symbol>, small cell (or TP) ID} for UE to be received discovery signals as RS on the small cells. Further, the processor 1451 may set an index indicating that DM-RS RE is mapped for detecting discovery signals from the TPs each. So, the processor 1461 may transmit RS signals at subcarriers and OFDM symbols in a predetermined subframes and a bandwidth according to the configuration and the index of DM-RS or new RS REs, and support to perform the time and frequency tracking more finely and adaptively according to data transmission points by the UE.

The wireless device 1460 includes a processor 1461, a memory 1462, and an RF unit 1463. The memory 1462 is coupled to the processor 1461, and stores a variety of information for driving the processor 1461. The RF unit 1463 is coupled to the processor 1461, and transmits and/or receives a radio signal. The processor 1461 implements the proposed functions, procedures, and/or methods. In the embodiments of the FIG. 2 to FIG. 13, the operation of the UE can be implemented by the processor 1461.

Especially, the processor 1461 may configure one or more cells with different frequencies, for this invention the processor 1461 configures the cells to support Semi-Persistent Scheduling, TTI-bundling, HARQ-ACK procedures. The processor 1461 may configure a configuration for resource mapping of DM-RS or new RS REs in small cells. Here, the configuration includes a first RS configuration for a macro cell, the first RS configuration includes at least one of configuration for a primary synchronization signal (PSS) and a secondary synchronization signal (SSS), a cell-common reference signal (CRS), or channel information reference signal (CSI-RS) to be transmitted on the macro cell. Furthermore, the configuration includes a second RS configuration for a small cell, and the second RS configuration includes a configuration for discovery signals to be transmitted on the small cell, REs of a set of DM-RS patterns used for a corresponding TP in the small cell are included.

The processor 1461 may determine REs of a set of DM-RS patterns of {<frequency, OFDM symbol>, small cell (or TP) ID} for the UE to be received discovery signals as RS on the small cells. Further, the processor 1461 may determine an index indicating that DM-RS REs of a set of DM-RS patterns mapped for detecting discovery signals from the TPs each. The processor 1461 may determine index indicating of the REs of a set of DM-RS patterns and further co-location information for the time tracking and frequency tracking between the macro and the small cell.

So, the processor 1461 may receive RS signals at subcarriers and OFDM symbols in a predetermined subframes and a bandwidth according to the configuration and the index of DM-RS or new RS, and perform the time and frequency tracking more finely and adaptively according to data transmission points.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for allocating resources for a reference signal in a wireless communication system, the method performed by a wireless device and comprising:
   selecting candidates resource element sets (RESs) for the reference signal and indexes to be mapped to the candidates RESs for the reference signal;
   checking an index indicating an RES, which is selected from among the indexes according to a transmission point (TP);
   receiving the reference signal on a corresponding subcarrier and a corresponding orthogonal frequency division multiplexing (OFDM) symbol in the RES indicated by the index; and
   performing a channel estimation by the reference signal, wherein the checking the index includes:
      determining whether the candidates RESs are grouped into a first set of RESs for a first TP and a second set of RESs for a second TP; and
      determining whether an index indicating the first set of RESs for the first TP includes an index 1, 3 and 5 and an index indicating the second set of RESs for the second TP includes an index 2, 4 and 6, and
   wherein the candidates RESs are indexed in a subcarrier and an OFDM symbol order.

2. The method of claim 1,
   wherein each of the candidates RESs includes two contiguous resource element (REs),
   wherein an interval between the candidates RESs is 4 in a frequency domain, and
   wherein a candidates RES for an even numbered slot and a candidates RES for an odd numbered slot are allocated in a same subcarrier and a same OFDM symbol within two slots each of a radio frame.

3. The method of claim 2, wherein the candidates RESs include 6 RESs.

4. The method of claim 3, wherein the candidates RESs include 12 REs selected from a demodulation reference signal (DM-RS) REs.

5. The method of claim 1, wherein the checking the index further includes:
   receiving bitmap information with a length 6 to indicate 6 RESs, or with a length 3 to indicate 3 pairs of the 6 RESs.

6. The method of claim 1, wherein the checking the index further includes:
   determining whether the index indicating the RES is in a set of a corresponding TP by using a cell identification (ID).

7. The method of claim 1, wherein the reference signal includes a discovery signal.

8. A wireless device for allocating resources for a reference signal in a wireless communication system, the wireless device comprising:
   a radio frequency (RF) unit configured to transmit and receive a radio signal; and
   a processor operatively coupled to the RF unit, wherein the processor is configured to:
      select candidates resource element sets (RESs) for the reference signal and indexes to be mapped to the candidates RESs for the reference signal,
      check an index indicating an RES, which is selected from among the indexes according to a transmission point (TP),
      receive the reference signal on a corresponding subcarrier and a corresponding orthogonal frequency division multiplexing (OFDM) symbol in the RES indicated by the index, and
      perform a channel estimation by the reference signal, wherein the index is checked by:
         determining whether the candidates RESs are grouped into a first set of RESs for a first TP and a second set of RESs for a second TP, and
         determining whether an index indicating the first set of RESs for the first TP includes an index 1, 3 and 5 and an index indicating the second set of RESs for the second TP includes an index 2, 4 and 6, and
      wherein the candidates RESs are indexed in a subcarrier and an OFDM symbol order.

9. The wireless device of claim 8, wherein each of the candidates RESs includes two contiguous resource element (REs),
   wherein an interval between the candidates RESs is 4 in a frequency domain, and
   wherein a candidates RES for an even numbered slot and a candidates RES for an odd numbered slot are allocated in a same subcarrier and a same OFDM symbol within two slots each of a radio frame.

10. The wireless device of claim 8, wherein the reference signal includes a discovery signal.

11. The wireless device of claim 8, wherein the processor is further configured to receive bitmap information with a length 6 to indicate 6 RESs, or with a length 3 to indicate 3 pairs of the 6 RESs.

12. The wireless device of claim 8, wherein the processor is further configured to check whether the index indicating the RES is in a set of a corresponding TP by using a cell identification (ID).

* * * * *